March 1, 1932.  E. W. DAVIS  1,847,383
COUPLING
Original Filed June 8, 1927
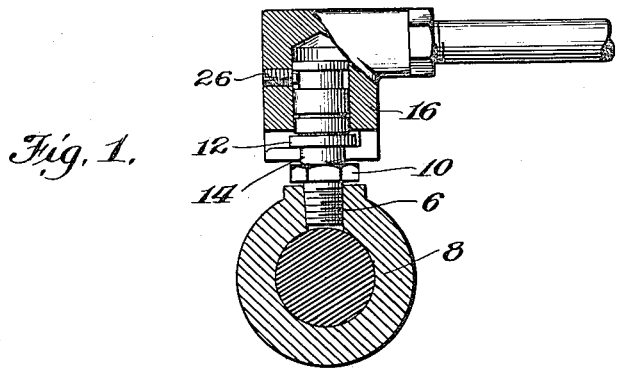
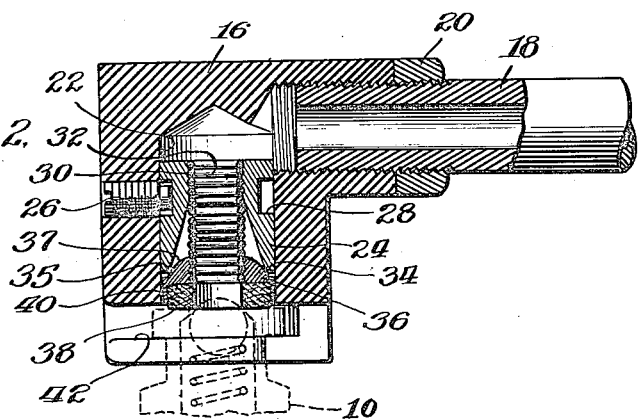
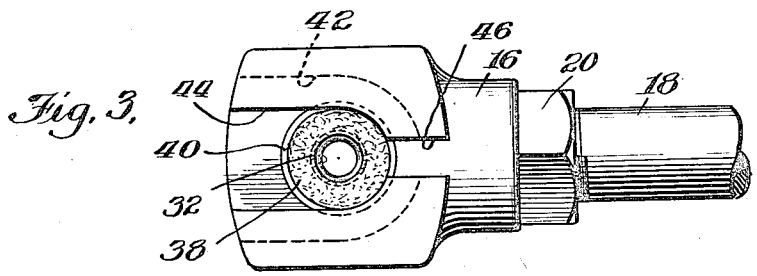
Inventor
Ernest W. Davis
By Williams, Bradbury, McCaleb & Hinkle
Attys.

Patented Mar. 1, 1932

1,847,383

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

COUPLING

Original application filed June 8, 1927, Serial No. 197,271. Divided and this application filed May 4, 1928. Serial No. 275,030.

My invention relates, generally, to high pressure lubricating apparatus and more particularly to quick detachable couplings for use in systems of this class in which a source of lubricant under high pressure is successively connected to a plurality of fittings attached to the bearings to be lubricated.

This application is a division of my copending application, Serial No. 197,271, filed June 8, 1927, now Patent Number 1,803,524 granted May 5, 1931 for lubricant compressors.

It is an object of my invention to provide an improved coupling of this type which may readily be used with heavy lubricants and which will form a perfectly sealed connection with a lubricant-receiving fitting.

A further object is to provide an improved coupling which will permit limited relative movement between the parts thereof.

A further object is to provide a quick detachable coupling which is relatively simple in construction, which may be economically manufactured, and which will be effective under various conditions of operation.

Other objects will appear from the following description, reference being had to the accompanying drawings, in which Fig. 1 is an elevation of my improved coupling device, parts thereof being broken away to show the sealing parts;

Fig. 2 is a central vertical sectional view of the coupling; and

Fig. 3 is a bottom plan view thereof.

In the lubrication of many kinds of machines, the bearings are each provided with a lubricant-receiving fitting of the type shown in Fig. 1, which comprises a threaded portion 6 which is adapted to be screwed into the oil hole of bearing 8 by means of a wrench engaging the hexagonal portion 10.

The fitting has an enlarged head 12 connected to the hexagonal portion by a neck 14. The fitting has a longitudinal bore, the upper end of which is closed by a check valve which lies flush with the top surface of the head portion 12. This fitting is adapted to be detachably connected to a coupling discharge nozzle body 16 which is threaded at the end of a conduit 18, the connection being locked by a nut 20. The conduit 18 leads from a suitable lubricant compressor or other source of lubricant under pressure.

The body 16 has a vertical bore 22, the upper end of which is in communication with the conduit 18. A member 24 is reciprocable within the bore 22, its movement being limited by the end of a headless set screw 26 which projects into an annular groove 28 formed in the member. The member has a central axial passageway formed therein, the upper end of this passageway having a spiral groove 30 formed therein which is adapted to receive a spring 32, and the lower end being flared and terminating in a narrow end portion 34, the inner circumferential edge 35 of which is adapted to engage the substantially spherical surface 37 of a gasket retainer 36. The retainer has a spirally-grooved passageway, the grooves thereof being formed to receive the lower end of the spiral coil spring 32. There is a slight amount of clearance between the wall of the bore 22 and the retainer so that the latter is capable of limited universal movement.

A centrally-apertured sealing washer or gasket 38 is secured to the retainer 36, being held by an internally-grooved annular flange 40 of the retainer 36.

As best illustrated in Figs. 2 and 3, the body 16 of the coupling has an undercut slot 42 formed about an opening 44. The slot 42 is sufficiently wide to receive the head 12 of the lubricant-receiving fitting and the opening 44 is of sufficient width to receive the neck 14 of said fitting. The coupling body also has a relatively narrow slot 46 which leads into the opening 44 and slot 42 and permits any foreign matter contained in the slot to be forced therefrom by the head of the fitting.

In operation, the coupling is attached to the fitting by sliding it from right to left (Fig. 1) until the head 12 of the fitting lies beneath the sealing gasket 38. The sealing gasket is capable of slight universal movement so that it may readily adapt itself to any slight irregularity in the angle of the top surface of the fitting. This construction has the great advantage that a perfect seal with a fitting may be effected even though the slot 42 is sufficiently deep to permit the coupling with the fitting to be made very readily. Thus it is not necessary to hold the coupling body 16 in exact alignment with the fitting since the gasket and retainer will automatically compensate for such inaccuracies in alignment, and also for slight irregularities in dimensions of the fittings. Accordingly the cost of manufacture of the fittings may be reduced, due to the greater tolerances which are permitted, and the operation of coupling is facilitated.

Upon application of lubricant under pressure, the lubricant will force the member 24 downwardly until the gasket 38 is firmly pressed against the top surface of the head of the fitting. Lubricant pressure is transmitted to the space behind the retainer 36 and exerts additional downward pressure upon this member.

The member 24 has a close sliding fit in the bore 22 so that no lubricant will leak between the walls of the bore and the member. The angular edge 35 is firmly pressed against the spherical surface 37 and prevents leakage of lubricant between the member and retainer irrespective of whether these parts are in exact axial alignment or not.

Upon relieving the lubricant pressure, the force tending to hold the gasket against the fitting will be removed and the parts may be easily uncoupled by sliding the coupling 16 to the right. Upon removal of the coupling from the fitting, the spring 32 will return the retainer 36 into normal position in axial alignment with member 24.

The invention is capable of variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In lubricating apparatus of the class described, a discharge nozzle adapted to make a quick detachable connection with a lubricant-receiving nipple, said nozzle comprising a body having a bore, a member slidably mounted in said bore, a second member mounted by a universal connection to said first-named member and adapted to form a lubricant-tight seal with a lubricant-receiving nipple, and resilient means connecting said members.

2. In lubricating apparatus of the class described, a discharge nozzle adapted to make a quick detachable connection with a lubricant-receiving nipple, said nozzle comprising a body having a bore, a member reciprocable in said bore, a gasket retainer, a universally movable mounting for said retainer, a sealing gasket carried by said retainer and adapted to form a lubricant-tight seal with a lubricant-receiving nipple, and tension means connecting said member and retainer.

3. A discharge nozzle for apparatus of the class described, comprising, in combination, means for making a quick detachable connection with a lubricant-receiving nipple, a member slidable relative to said means, a sealing gasket having a ball-shaped part universally pivoted in said member, and a tension spring connecting said member and said sealing gasket.

4. A discharge nozzle for apparatus of the class described, comprising, in combination, means for making a quick detachable connection with a lubricant-receiving nipple, a member slidable relative to said means and having a sharp edge, a sealing device having a spherical surface engaging said edge, and a tension spring connection between said member and said sealing device, said connection permitting limited universal movement of said device relative to said member.

5. A lubricant connection comprising male and female parts adapted to be quickly, releasably locked together, said female part comprising a body having a bore, a member slidably in said bore and having a sharp edge, a sealing device having a spherical surface and adapted to form a lubricant seal at said edge.

6. A discharge nozzle for a lubricant discharge conduit, comprising in combination, means for making a quick detachable connection with a lubricant receiving nipple, said means comprising a body having a bore, a member slidably mounted in said bore and having a sharp lower edge, a sealing device universally mounted below said member and having a spherical upper surface adapted to form a lubricant seal between said upper member and a lubricant receiving nipple.

In witness whereof, I hereunto subscribe my name this 30th day of April, 1928.

ERNEST W. DAVIS.